April 10, 1962  F. C. HUYSER  3,028,754
MEASURING INSTRUMENT
Filed Nov. 10, 1958  2 Sheets-Sheet 1

INVENTOR
FRANCIS C. HUYSER
BY
Pollard, Johnston, Smythe & Robertson
ATTORNEY

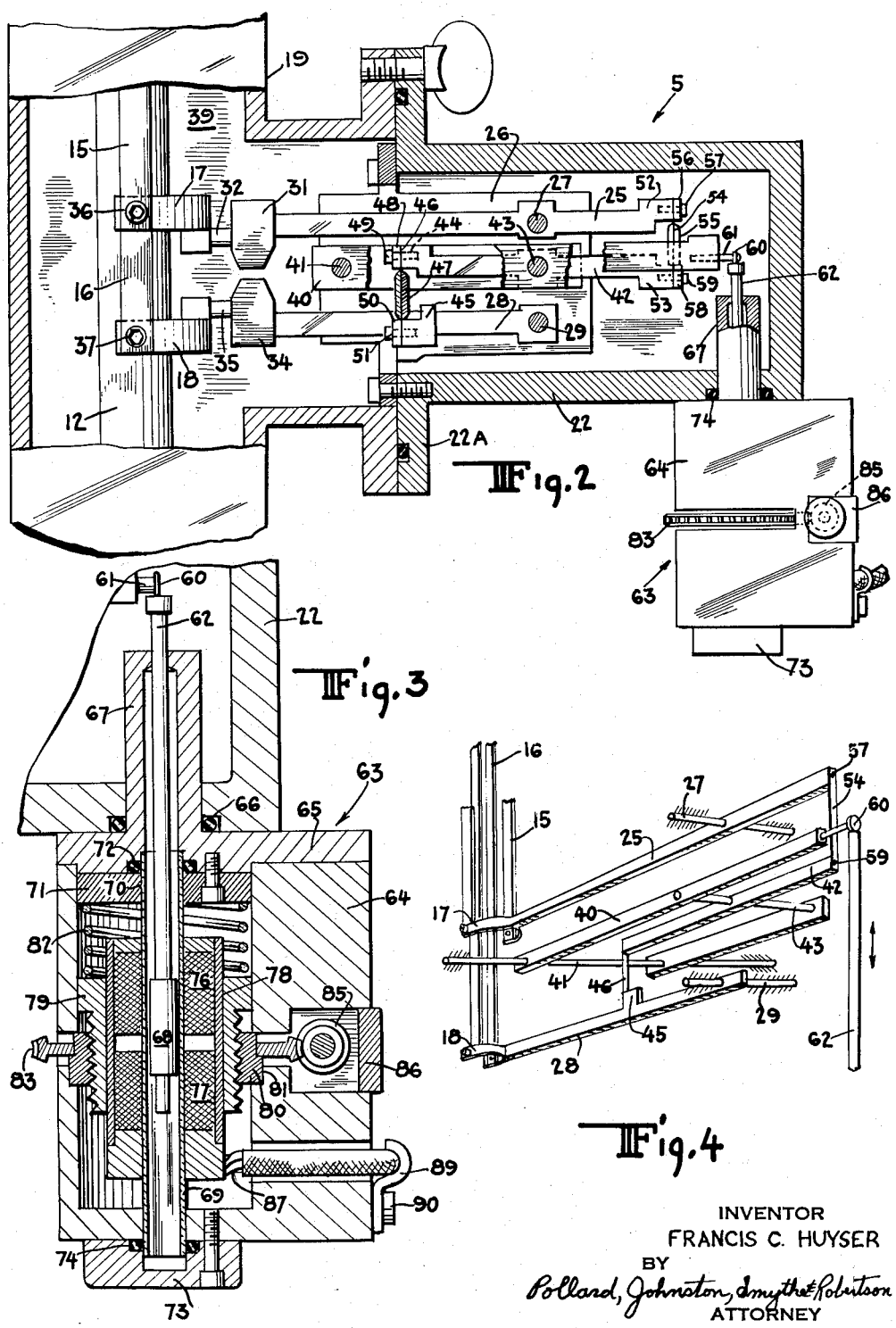
April 10, 1962     F. C. HUYSER     3,028,754
MEASURING INSTRUMENT
Filed Nov. 10, 1958     2 Sheets-Sheet 2
INVENTOR
FRANCIS C. HUYSER
BY
Pollard, Johnston, Smythe & Robertson
ATTORNEY United States Patent Office 3,028,754
Patented Apr. 10, 1962

3,028,754
MEASURING INSTRUMENT
Francis C. Huyser, Moline, Ill., assignor to Ametek, Inc., a corporation of Delaware
Filed Nov. 10, 1958, Ser. No. 772,839
6 Claims. (Cl. 73—88.5)

The present invention relates to a strain measuring device of the type used in creep testing wherein a specimen is stressed while being subjected to high temperatures.

In creep testing of some types of materials, the stressed specimen is enclosed in a sealed furnace which may be evacuated or may contain a gas atmosphere. The device for measuring the strain occurring in the specimen must be compatible with the sealing requirements of the furnace or enclosure surrounding the test specimen. Consequently, it is required that the linkage means and related measuring parts be contained within a sealed housing which may be mounted over an opening leading into the specimen enclosure, movement of the linkage means being transferred to the exterior of the housing.

It is an object of the present invention to provide a strain measuring device for creep testing, the linkage means of which is completely sealed in a compact housing attached to the testing machine and its furnace or specimen heating arrangement.

It is further an object of the invention to provide a displacement measuring device actuated by a linkage means which is coupled to the test specimen which may be zero adjusted without disturbing the sealed system.

It is a further object of the invention to provide a compact system of levers to magnify and indicate the deformation of the test specimen.

The invention is particularly adapted for use with a creep testing machine in which the specimen is subjected to high temperature vacuum or high temperature gas atmosphere conditions. It includes a sealed enclosure having means within the enclosure to measure the dimensional changes of the test specimen. A slug of magnetic material within the enclosure is surrounded by an electrical coil means or transducer mounted exteriorly of the enclosure, the slug being moved by the measuring means to produce a signal. In this manner, the deformation of the specimen is magnified and measured while the sealed conditions of the enclosure are maintained.

The transducer coil is mounted outside of the sealed housing in such a manner that the coil can be movable axially relative to the slug so as to zero adjust the same. Preferably, the slug moves in a non-magnetic tube which is surrounded by the coil means. The coil means may have threads on its exterior walls which are engaged by a rotatable nut. Rotation of the nut will result in the axial movement of the coil. The coil or transducer preferably is in the form of a differential transformer.

These and other objects, features and advantages of the invention will become apparent from the following detailed description and drawings which are merely exemplary.

In the drawings:

FIG. 2 is an enlarged fragmentary sectional view of the measuring instrument taken along the line 2—2 of FIG. 1.

FIG. 3 is an enlarged fragmentary sectional view of the differential transformer means of FIG. 2 for indicating deformation of the test specimen.

FIG. 4 is a perspective schematic view of one form of lever system for the measuring instrument.

Figure 1:
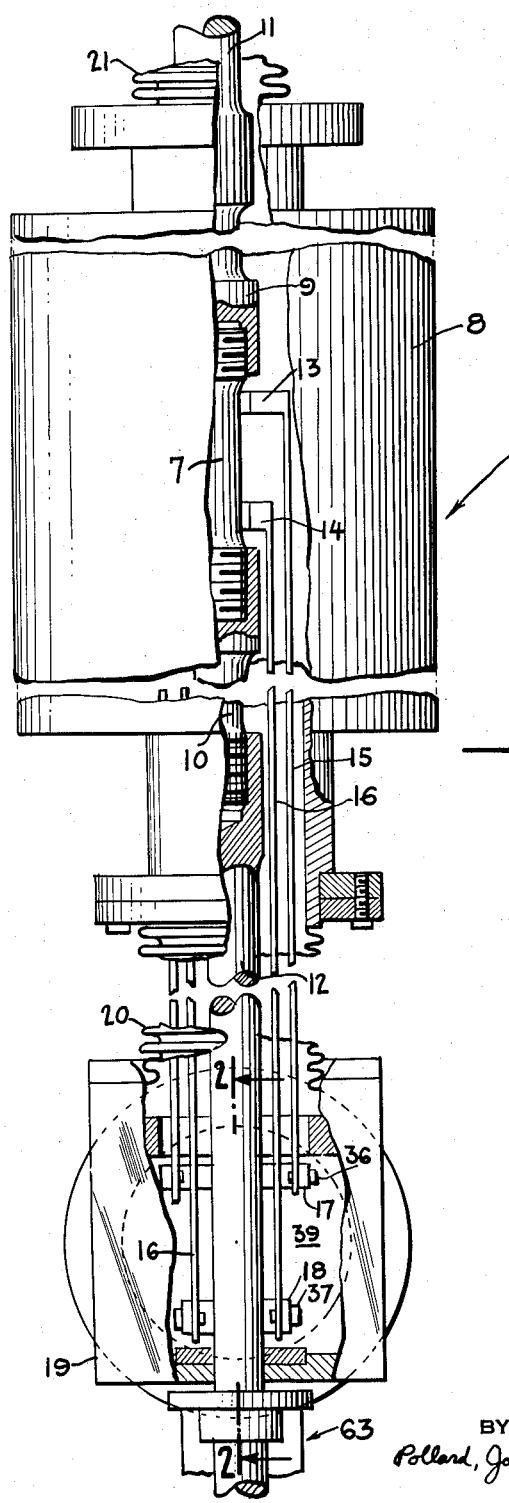
FIG. 1 is a view partly in section of the measuring instrument mounted on a creep testing machine.

Creep testing machine 6 illustrated in FIG. 1, may have test specimen 7 mounted inside of heating unit 8 by grippers 9 and 10 which are attached to rods 11 and 12 respectively. Loading means (not shown) connected to rods 11 and 12 maintain the test specimen 7 under tension.

A pair of spaced elements 13 and 14 engage specimen 7, movement of the elements 13 and 14 being transmitted through bars or links 15 and 16, respectively, to plates or yokes 17 and 18, respectively (FIGS. 1, 2, 4) at the lower portion of the machine. Yokes 17 and 18 are formed, in any desired manner, so as to be free of pull rod 12.

The housing 22 (FIGS. 2, 3) which contains the linkage or lever means and the transducer extends rearwardly of enclosure 19 as seen in FIG. 1.

In order to test the creep strength of materials in a controlled atmosphere, heating unit 8 is sealed to enclosure 19 by expandable seal member or bellows 20 which surrounds a portion of rod 12 and the links 15, 16. The upper portion of heating unit 8 is sealed to rod 11 by seal member or bellows 21. Movement or creep of specimen 7 is transmitted to measuring instrument 5 in a manner about to be described.

As shown in FIG. 2, housing 22 of the measuring instrument is provided with a mounting flange 22A for attachment to the enclosure 19 of the creep testing machine. Upper lever 25 is pivotally attached to support 26 by means of pivot 27. Lower lever 28 is pivotally attached to support 26 by pivot 29. Upper yoke 17 is adjustably attached to bracket 31 mounted on upper lever 25 by means of the adjustment screw 32, while lower yoke 18 is adjustably attached to bracket 34 mounted on lower lever 18 by means of adjustment screw 35. Screws 36 and 37 serve to fasten bars 15, 16 to yokes 17 and 18, respectively.

The sealed enclosure in which the heating means 8, specimen 7 and dimension change measuring means are located includes inside portion 39 of enclosure 19 containing the heat and vacuum or gas atmosphere to which specimen 7 is subjected. Intermediate lever 40 is pivotally attached to support 26 by pivot 41 while the additional lever 42 is pivotally attached to intermediate lever 40 by pivot 43. End 44 of additional lever 42 is attached to bracket 45 on lower lever 28 by means of the thin flexible strip means 46. Strip 46 is clamped to end 44 of additional lever 42 by means of cap 48 and screw 49. Cap 50 and screw 51 clamp sheet 46 to bracket 45.

End 52 of upper lever 25 is attached to end 53 of the additional lever 42 by means of the flexible sheet or strip 54 which is clamped to end 52 by means of cap 56 and screw 57. In a similar fashion, sheet 54 is clamped to end 53 by cap 58 and screw 59. Disc 60 mounted on stud 61 of the intermediate lever 40 transmits the motion of the intermediate lever 40 to rod 62 of the differential transformer 63.

Preferably a differential transformer is used for producing a signal in response to change in dimension of the specimen. The transformer 63 has a housing or frame 64 attached to mounting plate 65 which extends into housing 22 and is sealed by sealing ring 66. Neck portion 67 of mounting plate 65 serves to pilot the upper portions of rod 62. The armature or slug of magnetic material 68 of differential transformer 63 is attached to the lower end of rod 62 and is suspended within glass or non-magnetic material sealing tube 69. Sealing tube 69 is mounted through opening 70 of the end plate 71 and is sealed to mounting plate 65 by ring 72. Cover 73 serves to mount the lower end of glass sealing tube 69 with respect to the transformer housing 64. Ring 74 provides the seal to cover 73. With this structure, it is evident that the vacuum or gas atmosphere of the enclosure 19 and remainder of the machine is sealed from the outer atmosphere at the differential transformer by means of the sealing tube 69, since tube 69 and cap 73 form a sealed hollow cylinder attached to the opening of neck portion 67 and containing rod 62 with armature 68.

Windings 76 and 77 of differential transformer 63 are held within sleeve 78 which is mounted within bushing 79. Bushing 79 is threadably attached to nut 80 mounted in circular groove 81 of the housing 64. Spring 82 serves to preload bushing 79 by reacting upon end plate 71. Nut 80 is provided with a worm wheel 82. Worm 85 rotatably mounted in bearing 86 engages worm wheel 83. Windings 76 and 77 are energized by leads 87 contained within cable 89 which is secured to the differential transformer housing by clamp 89 and screw 90.

FIG. 4 is a perspective schematic representation of the lever system for the instrument. During the creep test, elongation of test specimen 7 will be transmitted to yokes 17 and 18. The resulting upward motion of yoke 17 will rotate upper lever 25 clockwise around pivot 27 while at the same time, lower yoke 18 will be displaced downward rotating lower lever 28 counter-clockwise about pivot 29. The resulting motions of levers 25 and 28 will be transmitted to the additional lever 42 which is pivotally attached to intermediate lever 40. The upward motion of yoke 17 and the downward motion of yoke 18 will result in a downward clockwise motion of intermediate lever 40 which is transmitted through disc 60 to rod 62 attached to armature 68 of the differential transformer. As shown in FIG. 4, intermediate lever 40 which is pivotally attached at pivot 41 has a mating member 92. Member 92 serves to support pivot 43 in conjunction with intermediate lever 40. The lever configuration of FIG. 4 provides the required degree of magnification while fitting within compact housing 22.

Upon conducting a creep test, spaced elements 13 and 14 are attached to the test specimen. It is then necessary to set the differential transformer 63 to a zero or null point. The positioning of the yoke members 17 and 18 results in an initial setting of armature 68 with respect to windings 76 and 77. To set a zero or null point for differential transformer 63, windings 76 and 77 are adjusted with respect to armature 68 by means of worm 85 and wheel 83 assembly. Thus, the windings contained within sleeve 78 and bushing 79 are positioned in an upward or downward manner against the bias of spring 82. Since the armature 68 is sealed by tube 69, the adjustment of the differential transformer 63 may be accomplished without disturbing the sealing of the measuring instrument.

It is to be understood that details of construction may be varied without departing from the spirit of the invention except as defined in the appended claims.

What is claimed is:

1. A device for measuring the deformation of a stressed test specimen contained within a sealed enclosure, specimen dimension change measuring means within said sealed enclosure, magnetic material slug means moveable by said measuring means within said sealed enclosure, signal producing coil means surrounding said slug means exteriorly of said enclosure and responsive to the relative position of said slug means therewith, and means for moving said coil means axially relative to said slug means so as to adjust the signal produced by said coil means.

2. A device for measuring the deformation of a stressed test specimen contained within a sealed enclosure, means subjecting a specimen in said enclosure to heat and selected atmosphere, specimen dimension change measuring means in said enclosure, magnetic material slug means connected to and moveable by said measuring means in said enclosure, transducer coil means surrounding said slug means exteriorly of said enclosure and responsive to the relative position of said slug means therewith, and means for moving said coil means axially relative to said slug so as to adjust the output of said coil means including frame means attached to said enclosure, threaded wall means for holding said coil means, threaded nut means engaged with said wall means and rotatably supported by said frame means so that rotation of said nut and wall means relative to each other will cause axial movement of said coil means relative to said slug means to adjust the output of said coil means, whereby the deformation of said stressed specimen in said sealed enclosure will produce a signal as a function of said deformation.

3. In a device for measuring the deformation of a stressed test specimen contained within a sealed enclosure, the combination including housing means having an open end, the open end of said housing means being mounted over an opening in said enclosure, upper and lower lever means pivotally attached to said housing means and extending through said opening, said lever means being movable in substantially the same plane, specimen gripping means attached to one end of each of said lever means within said enclosure, intermediate lever means pivotally attached at one end to said housing means proximate to said enclosure, said intermediate lever means being movable in a plane substantially parallel to the plane of movement of said upper and lower lever means, additional lever means pivotally attached to said intermediate lever means and movable in a plane substantially parallel to the plane of movement of said upper and lower lever means, each of the ends of said additional lever means being flexibly attached to different ends of said upper lever means and said lower lever means opposite the ends to which said gripping means are attached, and differential transformer means having an armature and coil means, the armature of said transformer means being actuated in response to the movement of said intermediate lever means and located within said housing means and the coil means being outside of said housing means, whereby deformation of said stressed specimen within said sealed enclosure is multiplied and measured.

4. In an extensometer for measuring the deformation of a stressed test specimen contained within a sealed enclosure, the combination including housing means having an open end, the open end of said housing means being mounted over an opening in said enclosure, upper and lower lever means pivotally attached to said housing means and extending through said opening, said lever means being movable in substantially the same plane, specimen gripping means attached to one end of each of said lever means within said enclosure, intermediate lever means pivotally attached at one end of said housing means proximate to said enclosure, said intermediate lever means being movable in a plane substantially parallel to the plane of movement of said upper and lower lever means, additional lever means pivotally attached to said intermediate lever means and movable in a plane substantially parallel to the plane of movement of said upper and lower lever means, said additional lever means being flexibly attached to different ends of said upper lever means and said lower lever means opposite the ends to which said gripping means are attached, differential transformer means having windings and an armature, the armature of said transformer means being actuated in response to the movement of said intermediate lever means, the armature being located within said housing means, means for supporting the windings of said differential transformer means, said support means being outside of said housing means and threadably attached to said housing means, and means for rotating said support means within said threaded attachment so as to position said windings with respect to said armature for zero adjusting said differential transformer means.

5. In an extensometer, the combination including housing means, at least two outer lever means pivotally attached to said housing means, said outer lever means being movable in substantially the same plane, specimen gripping means attached to each of said outer lever means, intermediate lever means pivotally attached to said housing means, said intermediate lever means being movable in a plane substantially parallel to the plane of movement of said outer lever means, additional lever means flexibly connected to different ends of said outer lever means opposite the ends to which said gripping means are attached, said additional lever means being pivotally attached to said intermediate lever means, and displacement indicating means actuated in response to the movement of said intermediate lever means whereby the deformation of a stressed specimen is multiplied and measured.

6. In a differential transformer device for translating displacement information, the combination including housing means, armature means movable within said housing means in response to said displacement information, winding means, means for slidably supporting said winding means along the inner surface of said housing means proximate to said armature means, nut means rotatably mounted in said housing means and threadedly engaged to said supporting means, resilient means biasing said supporting means against the threaded engagement of said nut means, and gearing means adapted to rotate said nut means, whereby said winding means is positioned with respect to said armature means for zero adjustment of said translating device.

References Cited in the file of this patent

UNITED STATES PATENTS

| | | |
|---|---|---|
| 1,716,553 | Higbee | June 11, 1929 |
| 2,364,930 | Turner | Dec. 12, 1944 |
| 2,375,034 | Semchyshen | May 1, 1945 |
| 2,539,980 | Lubahn | Dec. 19, 1950 |
| 2,564,221 | Hornfeck | Aug. 14, 1951 |
| 2,588,630 | Jackman | Mar. 11, 1952 |
| 2,821,784 | Huyser | Feb. 4, 1958 |

UNITED STATES PATENT OFFICE
CERTIFICATE OF CORRECTION

Patent No. 3,028,754            April 10, 1962

Francis C. Huyser

It is hereby certified that error appears in the above numbered patent requiring correction and that the said Letters Patent should read as corrected below.

Column 4, line 12, after "means" insert a comma; column 6, line 14, for "2,539,980" read -- 2,534,980 --.

Signed and sealed this 21st day of August 1962.

(SEAL)
Attest:

ESTON G. JOHNSON
Attesting Officer

DAVID L. LADD
Commissioner of Patents